United States Patent Office 3,049,215
Patented Aug. 14, 1962

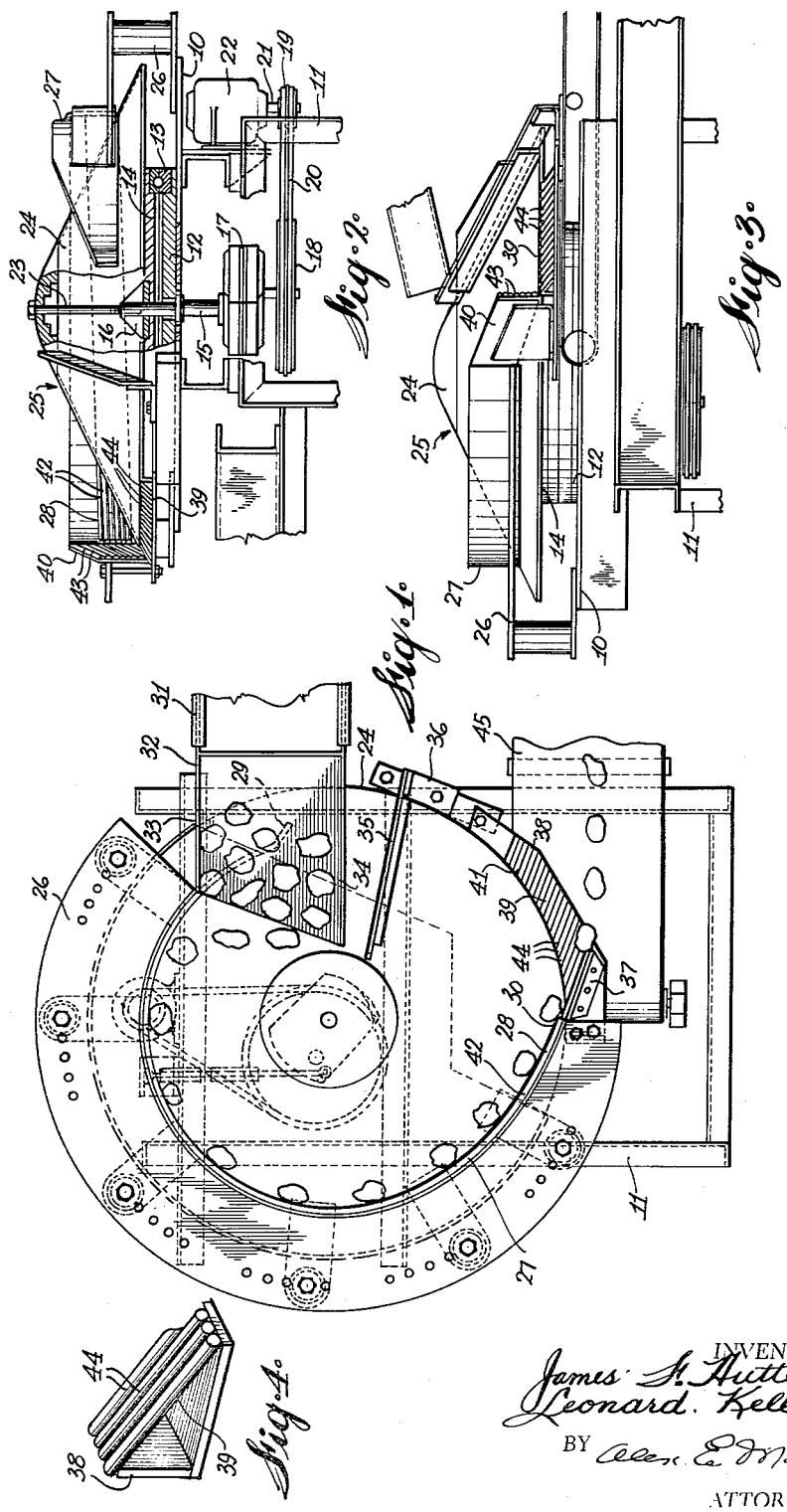

3,049,215
SINGLE ROW FEEDER
James F. Hutter and Leonard Kelly, Bancroft, Ontario, Canada, assignors to K & H Equipment Limited, Toronto, Ontario, Canada
Filed Mar. 28, 1960, Ser. No. 17,975
6 Claims. (Cl. 198—30)

This invention relates to a device for feeding objects in a single row.

In the treatment, sorting or inspection of objects such as pieces of ore and the like, as well as manufactured objects, it is sometimes desirable to provide a single row of such objects. For instance, the sorting apparatus described in our copending application for patent filed March 3, 1958, under Serial Number 718,874, now Patent No. 3,011,634, requires that the objects to be sorted be disposed in a single row. A suitable type of single row feeder is disclosed in our copending application for patent filed May 22, 1958, under Serial Number 737,149, now Patent No. 2,941,651.

It is an object of this invention to provide an improved single row feeder which is arranged to accept a slow-moving line-abreast stream of objects, which may be of varying seizes and of irregular shape, and to deliver such objects onto a faster-moving conveyor in a single aligned row disposed substantially along the center line or longitudinal axis of the conveyor.

The invention will be described with reference to the accompanying drawing, in which FIGURE 1 is a plan view of a device in accordance with the invention, FIGURE 2 is a side elevation, partly in section, of the device, FIGURE 3 is another side elevation of the device, and FIGURE 4 is a perspective view of a portion of a discharge trough.

Referring to the drawing, 10 is a base plate supported in a frame generally indicated at 11. Fixed to plate 10 is a bearing disc 12 supporting an annular bearing 13 on which is mounted for rotation thereon a bearing disc 14. A normally vertically disposed driven shaft 15 extends through the plate 10 and bearing discs 12 and 14, disc 14 being fixed to shaft 15 and 16 for rotation thereby. Shaft 15 is driven through a suitable speed reducer 17 by pulleys 18 and 19 and belt 20 from the driving shaft 21 of a motor 22. Fixed to the upper end of shaft 15, as by means of a threaded rod 23, is a member 24 having a conical upper surface 25.

Fixed to frame 11 as by means of a bracket 26 is a guide band 27 spirally curved about the axis of conical surface 25 and disposed above such surface in angular relation thereto. In the modification shown, the band 27 is in substantially parallel relation to the axis of surface 25 (that is, in normally vertical position) but it may deviate somewhat from this particular relation. The lower edge of the band is spaced slightly above the surface 25 and normally such spacing will be of the order of a fraction of an inch or just sufficient to prevent frictional contact between band and surface 25. The band has an inner object-engageable spiral surface 28 having one end 29 thereof disposed above the surface 25 located in substantially spaced relation to the axis and periphery thereof and its other end 30 disposed directly above the periphery of surface 25. The surface 28 describes the major portion of but less than one complete convolution about the axis of surface 25.

A feeder 31 for objects to be sorted has a discharge chute 32 disposed directly above surface 25. The width of chute 32 is such that one side 33 thereof is located adjacent the end 29 of the surface 28 and the other side 34 located in approximately alignment with the axis of surface 25 whereby objects discharged from the chute will be deposited on surface 25 in an area located generally between the axis of surface 25 and the end 29 of the band.

A baffle 35 fixed to the frame as by a bracket 36, may be provided above surface 25 and in proximity to the side 34 of the chute.

Mounted in fixed relation to the band 27, as by a bracket 37, is a discharge trough 38 having an inclined bottom wall 39 and an upright wall 40 at one end thereof. The upright wall 40 is a continuation of end 30 of the band and is inclined downwardly therefrom. Upright wall 40 is at an angle to the tangent of the cone at this point. While this angle may vary from 15 to 30°, it is preferably at an angle of approximately 22½° to the tangent of the conical surface. Bottom wall 39 is also inclined downwardly from the periphery of the conical surface 25 and is of generally arcuate shape with an arcuate inner edge 41 conforming to the periphery to the conical surface and in close proximity thereto.

In order to provide a smooth, long-wearing, substantially frictionfree object engageable surface, the inner surface of the spiral band 27 is preferably lined with a plurality of curved segmental liner plates or a plurality of longitudinally or horizontally disposed rods 42 which may be formed of a hard metal alloy such as that known under the trade name Stellite. Furthermore, the inner surface of upright wall 40 of the trough is similarly preferably lined with a plurality of liner plates or longitudinally disposed rods 43 of hard metal alloy. Bottom wall 39 is preferably constituted by a plurality of rods 44 of hard metal alloy. The resulting surfaces or band 27 and trough 38 may be grooved in the direction of movement of objects moving therealong for generally frictionfree engagement thereof, such grooved surfaces presenting ridges serving to prevent spinning movement of the objects.

A belt conveyor 45 is located with its feed end directly below the discharge trough 38 with its center line located in approximate alignment with the end of upright wall 40 of the trough. The upper travelling portion of the belt conveyor is in a horizontal plane disposed slightly below (say, a fraction of an inch) the discharge lip of the trough.

In operation, as the objects are deposited onto the rotating conical surface 25, centrifugal force will tend to slide the same towards the outer periphery thereof and into sliding pressure contact with the stationary guide band 27. Since the latter is of spiral configuration, it leads the objects into paths of progressively increasing radius, thus effectively increasing their speed and separation. This separation leaves room for objects deposited closer to the central portion of surface 25 to slide into place against the guide band and form a single row. Thus, the objects are ejected into the trough 38 in a single row and thence onto the conveyor belt 45 in a single row aligned approximately along the center line thereof.

The present invention has particular application to the single row feeding of irregular, varying sized, objects such as pieces of rock. Rocks such as quartzite, syenite, and biotite gneiss have very different coefficients of friction on metal such as steel and cannot in practice be persuaded to discharge in a constant direction at the end of a circular non-spiral guide band if a required relatively low discharge velocity (say, about 3 feet per second) is to be maintained. The spiral band of the present invention therefore has the following functions:

(1) To increase the tangential velocity of the rocks to their required discharge velocity as they progress to points of increased radius.

(2) To increase the spacing between peripheral rocks as they slide radially outward during rotation, thus permitting non-peripherally situated rocks to push into line against the band.

(3) To maintain sliding, rather than static frictional contact, between the rocks and the conical surface, such lower coefficient aiding substantially the spreading, lining-up action.

(4) To discharge all rocks in the same direction regardless of friction coefficients because of the smooth, continuously increasing radial acceleration imparted by the spiral configuration of the band.

(5) To discharge the rocks at a large angle to the conical surface tangent, thus providing a rapid transition from the conical surface to discharge trough. This drastically reduces spinning action which occurs during the time the rocks are in contact with both stationary trough and rotating conical surface.

The discharge trough must be as short and as hard as possible to minimize the differential retarding effect caused by varying coefficients of friction of the rocks; otherwise, the rocks will tend to overtake one another. A trough about six inches long and formed in the manner described has been found satisfactory. As previously indicated, spinning movement is retarded by engagement of the irregular surfaces of the rock with the grooved surfaces of the trough.

A particular application of the feeder described calls for the varying sized rocks to be delivered not only in single rows but substantially centered in the row. Thus, merely to align the discharged row of rocks on the belt in parallel relation to the direction of movement of the belt will not accomplish this. Instead, the center line of the belt is arranged to bisect the angle between the discharge direction as defined by the object receiving surface of upright wall 40 and the discharge trough lip. The effect of this arrangement is to carry larger rocks farther over the center line of the belt than the smaller ones before contact is made with the belt surface. The rock then pivots about the point of contact in response to the direction of motion of the belt, and the tail end of the rock slides into centered alignment behind, under the combined influence of the discharge velocity and the discharge trough upright wall.

The dimensional characteristics of the conical surface 25 will depend upon the particular application involved for instance, the cone angle is dependent on the following factors:

(1) Friction and shape characteristics of the objects being handled.
(2) Diameter and speed of rotation.
(3) Frictional characteristics of the material from which the conical surface and guide band surface are formed.

For example in a feeder designed to deliver rocks in the 3–12″ size range onto a belt travelling at 180 f.p.m., optimum performance is obtained when the following characteristics are met:

Angle_____ 25° to horizontal.
Diameter_____ 60 inches.
Speed_____ 20 r.p.m.
Material_____ Abrasive plate of the type known under the trade name Drumco.

We claim:

1. A feeding device for a single row feeder having a member mounted for rotation about a substantially vertical axis and having an upper surface for reception of objects to be fed in a single row, said surface being of inverted conical configuration and having a circular periphery, and a band stationarily mounted above said member and having a spirally curved surface disposed in close proximity and in angular relation to said rotatable surface, said stationary surface describing the major portion of but less than one complete convolution about the axis of said rotatable surface and having a discharge end disposed directly above the periphery of said rotatable surface, which comprises a stationary discharge trough having an upright wall, said upright wall having a flat object-receiving surface tangentially disposed with respect to the discharge end portion of said stationary surface and having an inner end edge adjoining said discharge end of said stationary surface and constituting a continuation thereof, and a bottom wall having an inner arcuate edge adjoining and conforming to the periphery of said rotatable surface, said bottom wall having an object receiving surface extending downwardly from said edge, said object-receiving surfaces terminating in a discharge lip, said object receiving surface of said trough upright wall being at an angle of the order of 15 to 30° to the tangent of said periphery of said rotatable surface at said discharge end of said stationary surface, said upright wall surface having an outer end edge terminating at said discharge lip, said upright wall surface being in a plane defining a discharge direction, said discharge direction being at an angle to said discharge lip, and a conveyor belt disposed below said discharge lip and having its center line in substantially bisecting relation to said angle between said discharge direction and said discharge lip.

2. A feeding device as defined in claim 1, said angle being of the order of 22½°.

3. A feeding device for a single row feeder having a member mounted for rotation about a substantially vertical axis and having an upper surface for reception of objects to be fed in a single row, said surface being of inverted conical configuration, and a band stationarily mounted above said member and having a spirally curved surface disposed in close proximity and in angular relation to said rotatable surface, said stationary surface describing the major portion of but less than one complete convolution about the axis of said rotatable surface and having a discharge end disposed directly above the periphery of said rotatable surface, which comprises a stationary discharge trough having an upright wall, said upright wall having an object-receiving surface having an inner end edge adjoining said discharge end of said stationary surface and constituting a continuation thereof, and a bottom wall having an inner arcuate edge adjoining and conforming to the periphery of said rotatable surface, said bottom wall having an object-receiving surface extending downwardly from said edge, said object-receiving surfaces terminating in a discharge lip, said object-receiving surfaces of said trough having a plurality of ridges therein extending from said inner edges to said lip.

4. A feeding device for a single row feeder having a member mounted for rotation about a substantially vertical axis and having an upper surface for reception of objects to be fed in a single row, said surface being of inverted conical configuration, and a band stationarily mounted above said member and having a spirally curved surface disposed in close proximity and in angular relation to said rotatable surface, said stationary surface describing the major portion of but less than one complete convolution about the axis of said rotatable surface and having a discharge end disposed directly above the periphery of said rotatable surface, which comprises a stationary discharge trough having an upright wall, said upright wall having an object-receiving surface having an inner end edge adjoining said discharge end of said stationary surface and constituting a continuation thereof, a bottom wall having an inner arcuate edge adjoining and conforming to the periphery of said rotatable surface, said bottom wall having a object-receiving surface extending downwardly from said edge, said object-receiving surfaces terminating in a discharge lip, and a plurality of hard metal rods in substantially sidewise abutting relation to each other and constituting said object-receiving surfaces of said trough and presenting ridges therein extending from said inner edges to said lip.

5. A feeding device for a single row feeder having a member mounted for rotation about a substantially vertical axis and having an upper surface for reception of objects to be fed in a single row, said surface being of inverted conical configuration, and a band stationarily mounted above said member and having a spirally curved surface disposed in close proximity and in angular relation to said rotatable surface, said stationary surface describing the major portion of but less than one complete convolution about the axis of said rotatable surface and having a discharge end disposed directly above the periphery of said rotatable surface, which comprises a stationary discharge trough having an upright wall, said upright wall having an object-receiving surface having an inner end edge adjoining said discharge end of said stationary surface and constituting a continuation thereof, and a bottom wall having an inner arcuate edge adjoining and conforming to the periphery of said rotatable surface, said bottom wall having an object-receiving surface extending downwardly from said edge, said object-receiving surfaces terminating in a discharge lip, said spirally curved surface of said band having a plurality of ridges thereon extending longitudinally from end to end thereof and constituting an anti-spin object-engaging surface.

6. A feeding device for a single row feeder having a member mounted for rotation about a substantially vertical axis and having an upper surface for reception of objects to be fed in a single row, said surface being of inverted conical configuration, and a band stationarily mounted above said member and having a spirally curved surface disposed in close proximity and in angular relation to said rotatable surface, said stationary surface describing the major portion of but less than one complete convolution about the axis of said rotatable surface and having a discharge end disposed directly above the periphery of said rotatable surface, which comprises a stationary discharge trough having an upright wall, said upright wall having an object-receiving surface having an inner end edge adjoining said discharge end of said stationary surface and constituting a continuation thereof, and a bottom wall having an inner arcuate edge adjoining and conforming to the periphery of said rotatable surface, said bottom wall having an object-receiving surface extending downwardly from said edge, said object-receiving surfaces terminating in a discharge lip, said spirally curved surface of said band having a plurality of hard metal rods fixed thereto and extending longitudinally from end to end thereof and constituting an anti-spin object-engaging surface.

References Cited in the file of this patent
UNITED STATES PATENTS

| | | |
|---|---|---|
| 1,225,172 | Privett | May 8, 1917 |
| 1,464,511 | Stott | Aug. 14, 1923 |
| 2,941,651 | Hutter | June 21, 1960 |